(12) United States Patent
Manal

(10) Patent No.: US 7,995,031 B2
(45) Date of Patent: Aug. 9, 2011

(54) TONGUE-OPERATED INPUT DEVICE FOR CONTROL OF ELECTRONIC SYSTEMS

(75) Inventor: Kurt Manal, Newark, DE (US)

(73) Assignee: University of Delaware, Newark, DE (US)

( * ) Notice: Subject to any disclaimer, the term of this patent is extended or adjusted under 35 U.S.C. 154(b) by 1672 days.

(21) Appl. No.: 10/864,491

(22) Filed: Jun. 10, 2004

(65) Prior Publication Data

US 2005/0275620 A1    Dec. 15, 2005

Related U.S. Application Data

(60) Provisional application No. 60/460,407, filed on Apr. 7, 2003.

(51) Int. Cl.
*G06F 3/033* (2006.01)
(52) U.S. Cl. .................. 345/157; 345/156; 600/549
(58) Field of Classification Search .......... 345/156–158; 825/19; 340/825.19; 600/549, 590, 593
See application file for complete search history.

(56) References Cited

U.S. PATENT DOCUMENTS

| | | | |
|---|---|---|---|
| 4,983,786 A |  | 1/1991 | Stevens et al. |
| 5,523,745 A | * | 6/1996 | Fortune et al. ........... 340/825.19 |
| 6,222,524 B1 |  | 4/2001 | Salem et al. |
| 6,702,765 B2 | * | 3/2004 | Robbins et al. .............. 600/590 |
| 2003/0120183 A1 | * | 6/2003 | Simmons ...................... 600/595 |
| 2005/0030285 A1 | * | 2/2005 | Fu ................................. 345/157 |

FOREIGN PATENT DOCUMENTS

WO    WO-92/20153    11/1992

OTHER PUBLICATIONS

ISA/US. International Search Report dated Aug. 18, 2004.
EP Examination Report dated Mar. 6, 2009.
Office Action dated May 7, 2010, Issued by Canadian Intellectual Property Office in CA App. Ser. No. 2,521,805.

* cited by examiner

*Primary Examiner* — Kimnhung Nguyen
(74) *Attorney, Agent, or Firm* — RatnerPrestia

(57) ABSTRACT

A method and apparatus for tongue-operated control of an electronic system is presented. The apparatus includes a sensor-mounting device secured in the mouth, a sensor that interfaces to the tongue and a sensor interface device that converts sensor outputs to sensor signals proportional to a measure of the interface of the tongue to the sensor, computes control signals from a vector sum of sensor signals, and couples either control signals or sensor signals to the electronic system by cable, radio frequency or infrared transmission.

23 Claims, 8 Drawing Sheets

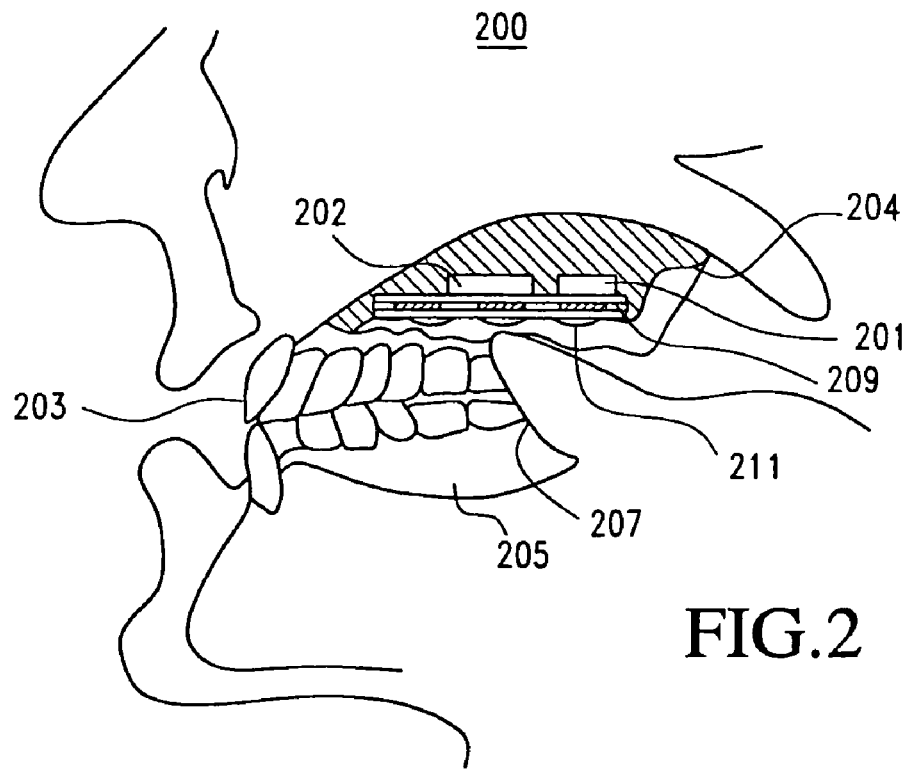
FIG.2
FIG.3
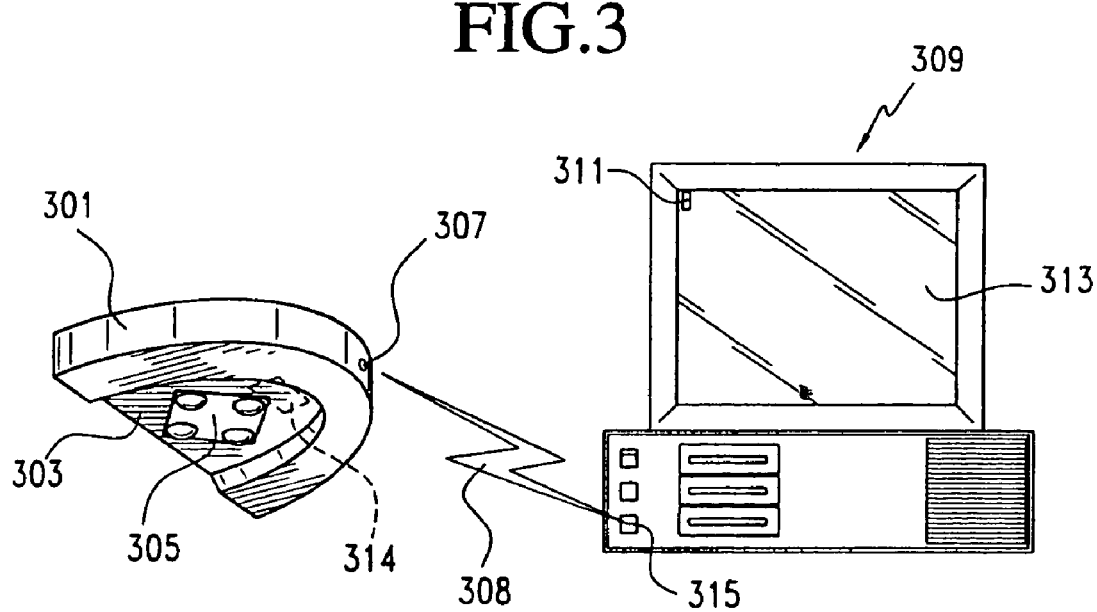

TONGUE-OPERATED INPUT DEVICE FOR CONTROL OF ELECTRONIC SYSTEMS

CROSS REFERENCE AND RELATED APPLICATIONS

This application claims priority under 35 U.S.C. §120 of International Patent Application No. PCT/US04/09583, filed on Mar. 29, 2004 by Kurt Manal entitled TONGUE-OPERATED INPUT DEVICE FOR CONTROL OF ELECTRONIC SYSTEMS, the entire contents of which are Incorporated by reference. As in the parent International Application No. PCT/US04/09583, priority under 35 U.S.C. §119(e) is also claimed to U.S. Provisional patent application Ser. No. 60/460,407 filed on Apr. 7, 2003 by Kurt Manal entitled TONGUE-OPERATED INPUT DEVICE FOR CONTROL OF ELECTRONIC SYSTEMS, the entire contents of which are incorporated by reference.

FIELD OF INVENTION

This invention relates to the field of controllers for electronic devices. More specifically, the invention is a tongue-operated input device for control of a cursor or other input interface used for operating a computer or other electronic systems.

BACKGROUND OF THE INVENTION

A number of input device technologies have been developed to allow individuals to control electronic systems. Examples include eye tracking systems, the head-mouse, and mouth-operated joysticks. Eye tracking systems track the gaze direction of the pupils of an individual to control electronic systems, such as computers. However, eye tracking systems may be prohibitively expensive (i.e., >$12,000) for most individuals to own for personal use. A head-mouse device tracks the motion of the individual's head in order to move a cursor on a computer screen. However, the head-mouse may: (1) be too cumbersome to use due to the size of the device, (2) cause undue fatigue because of the muscular effort required to move the device, or (3) be useless to individuals who have a limited range of motion. Mouth-operated joysticks can allow an individual to use their mouth or tongue to operate an electronic system such as a motorized wheelchair. However, a mouth-operated joystick can cause undue fatigue and may not be practical for use by individuals with poor muscle tone or spasticity.

Background art examples of mouth-based input devices for controlling electronic systems include tongue-activated and mouth-operated devices. U.S. Pat. No. 5,523,745 discloses a tongue-activated keypad communications controller for use by disabled or other persons to control a variety of devices. However, operation of this tongue-activated keypad may be time-consuming and complex due to the relatively large number of keys (i.e., 9) used in operating the device. U.S. Pat. No. 6,222,524 discloses a mouth-operated input device for use with an element to be moved on a computer. This input device includes a tongue-operated joystick and teeth-operated switches (i.e., the individual selectively bites down with their teeth to select different switches). However, operation of this mouth-operated device may be fatiguing, particularly in prolonged use, due to the resistance offered by the tongue-operated joystick and the complexity of operation due to the requirement to selectively apply pressure by biting down with different teeth to operate different switches.

Therefore, there is a need in the art for an input device for controlling electronic systems that is affordable, portable, easy to use by individuals with physical limitations, and minimizes fatigue and complexity of operation during use.

SUMMARY OF THE INVENTION

The invention is referred to as a "Mouth Mouse." In order to alleviate the shortcomings of other input device technologies and the background art, the present invention provides an affordable and portable apparatus for the tongue-operated control of an electronic system. The present invention includes a sensor-mounting device configured to reside in the mouth, a sensor configured to interface to the tongue, and a sensor interface device. The sensor is mounted on the sensor-mounting device and the sensor interface device couples the sensor to the electronic system. Non-limiting examples of a sensor-mounting device include a dental retainer and a mouth-guard. Non-limiting examples of a sensor includes pressure sensors, temperature sensors, other types of individual sensing devices and a single surface sensing device comprising a 2-dimensional array of miniature sensors.

In addition, the invention is a method for tongue-operated control of an electronic system that includes receiving sensor outputs form each sensor, converting sensor outputs to sensor signals, comparing sensor signals from each sensor with a predetermined threshold, computing a vector sum of the sensor signals above the predetermined threshold, generating control signals that are indicative of the magnitude and angle of the computed vector sum of the sensor signals, and transmitting control signals or sensor signals for the control of the electronic system. Non-limiting examples of electronic systems include computers, motorized wheelchairs, and other remotely controlled devices and systems.

Further, the invention is a method for tongue-operated movement of an input interface that includes receiving control signals or sensor signals, comparing sensor signals with a predetermined threshold, computing a vector sum of the magnitude and angle data determined from the sensor signals that exceed the predetermined threshold, generating control signals that are indicative of the magnitude and angle of the computed vector sum of the sensor signals, and moving the input interface at a rate related to the magnitude and in a direction related to the angle of the vector sum. Non-limiting examples of an input interface include cursors, pointers, arrows and other input/selection devices for remotely controlled devices and systems.

Moreover, the invention is a method for tongue-operated control of an electronic system that includes an electronic system receiving at least one of control signals and sensor signals computing the vector sum of the magnitude and angle data determined from the at least one of control signals and sensor signals, moving the input interface at a rate related to the magnitude and in a direction related to the angle of the vector sum, applying the input interface to an on-screen program icon, and selecting the on-screen program icon. Non-limiting examples of methods for selecting an on-screen program icon include hovering over the selection and applying pressure to a sensor for selection.

The invention is also a system for controlling an electronic system that includes a Mouth Mouse configured to communicate by at least one of cable, radio frequency, and infrared communication interface, and an electronic system configured to communicate by at least one of cable, radio frequency, and infrared communication interface, wherein the at least one of cable, radio frequency, and infrared communication interface couples the Mouth Mouse and the electronic system.

Advantages of the invention include relatively low cost due to simplicity of design, inherent portability because it is located in the mouth, ease of use by individuals with physical limitations because minimal motor skills and physical strength is involved in usage of the device, and reduced fatigue and complexity because of the minimal number of control surfaces (i.e., sensors) involved in operation of the device. In addition, the tongue is an ideal control mechanism because it can be positioned very accurately and can be used to apply force in fine increments in controlling the device. Moreover, a user may talk while wearing the Mouth Mouse because word pronunciation is minimally affected.

BRIEF DESCRIPTION OF DRAWINGS

FIG. 2 shows a second exemplary embodiment of the Mouth Mouse.

FIG. 3 shows a third exemplary embodiment of the Mouth Mouse.

DETAILED DESCRIPTION OF THE PREFERRED EMBODIMENTS

In the following detailed description of the preferred embodiments, reference is made to the accompanying drawings that form a part hereof, and in which are shown, by way of illustration, specific embodiments in which the invention may be practiced. It is to be understood that other embodiments may be utilized and structural changes may be made without departing from the scope of the present invention.

Figure 1A:
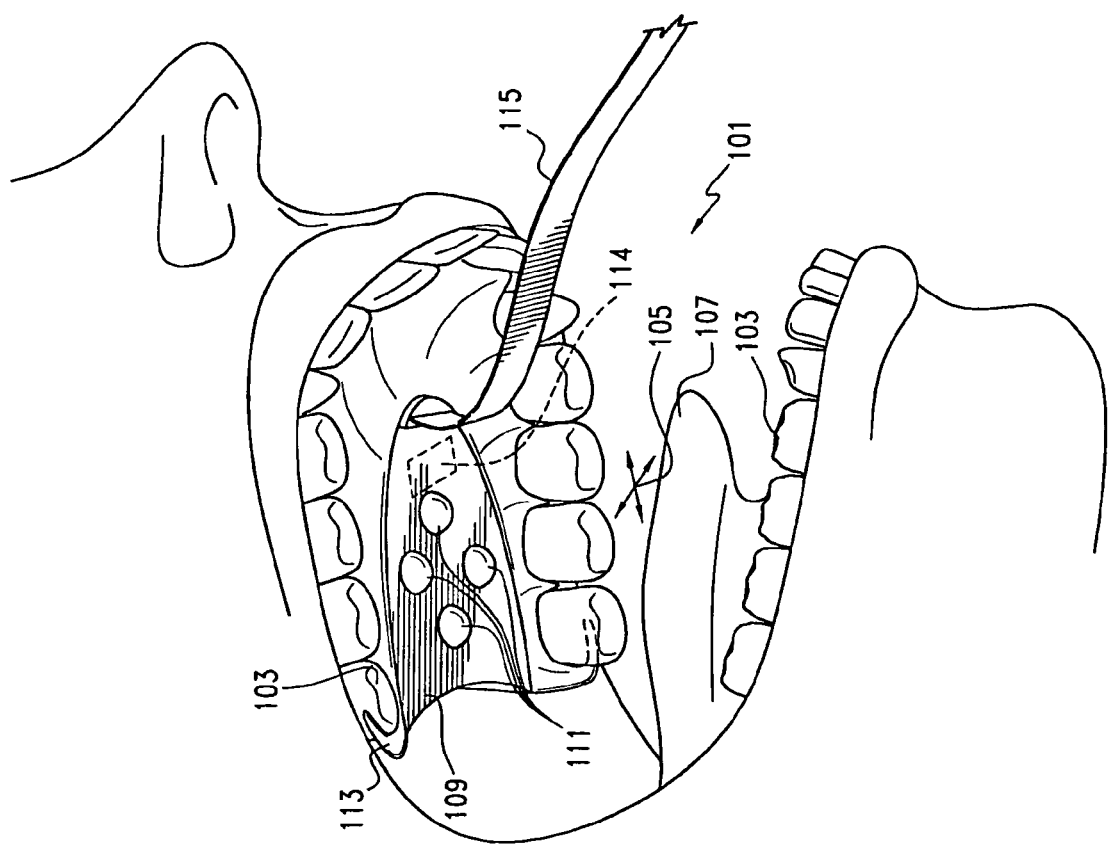
FIG. 1a shows a first exemplary embodiment of the Mouth Mouse.

FIG. 1a shows a first exemplary embodiment of the Mouth Mouse. A sensor-mounting device 109 contains sensor 111 and is located inside the mouth 101. The sensor-mounting device 109 is held in place by clips 113 that are hooked around individual teeth 103. The sensor-mounting device 109 includes a top cover (not shown) to protect the electronics from moisture. The sensor 111 has regions that represent at least the four primary directions, as indicated by the set of co-ordinate X-Y axes 105, along which an individual would move a control signal for an electronic system. These X-Y axes form a set of ortho-normal basis vectors that completely span a 2-dimensional space (e.g., a computer screen) and are used to describe the movements of an input interface. An ortho-normal basis provides a minimal set of spanning vectors for an N-dimensional space. The tongue 107 of the individual is used to select one or more regions of the sensor 111 as an indication of the desired rate and direction of movement for control signals that are used to control an electronic system. The sensor interface device 114 can convert sensor signals from the sensor 111 into control signals compatible with an electronic system to be controlled.

Figure 1B:
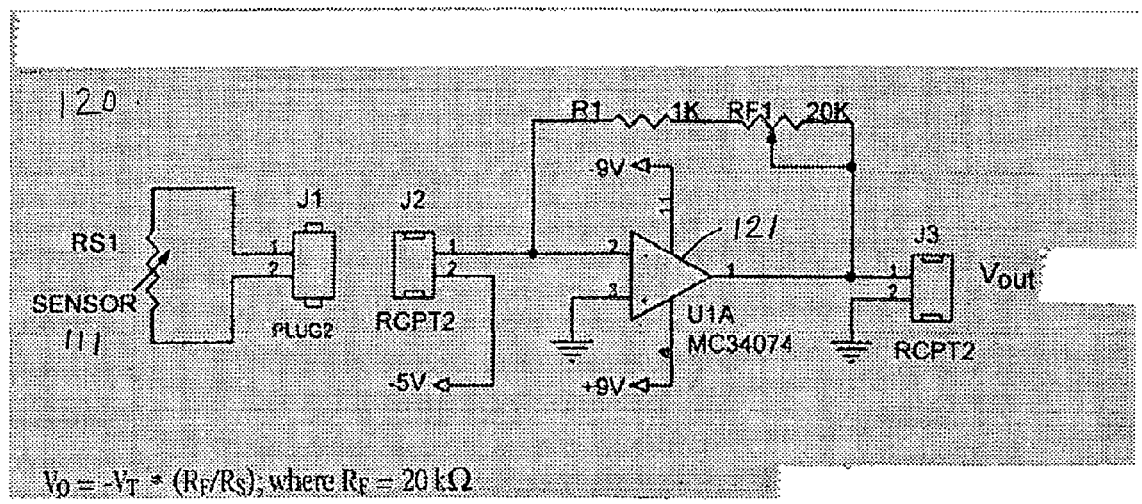
FIG. 1b is a schematic of an exemplary circuit for the sensor interface.

FIG. 1b is a non-limiting example of a drive circuit 120 that can be used in the sensor interface device 114. The drive circuit 120 includes an amplifier 121 configured to amplify/convert sensor outputs from the sensor 111 into sensor signals. As a non-limiting example of a conversion, the resistance of the sensor 111, shown in FIG. 2, can be changed by application of pressure by the tongue 107 and a sensor signal output (i.e., $V_{out}$ for the sensor shown in FIG. 2) is produced. Sensor signals, proportional to a measure of the interface of the tongue (i.e., applied pressure for this example) to the sensors, are produced as sensor outputs. A drive circuit 120, analogous to that shown in FIG. 1b, would be provided for each region of the sensor 111. The sensor interface further includes means for computing control signals from sensor signals. Means for computing control signals include a computer, amplifier or other electronic circuits capable of determining magnitude and angle of a vector. The sensor interface device 114 may determine control signals from the sensor signals. The sensor interface may also transmit either control signals or sensor signals to the electronic system by the cable 115. For this exemplary embodiment, the sensor interface device 114 may be located either on the topside of the sensor-mounting device 109 or at the electronic system to be controlled. Thus, either control signals or sensor signals from the sensor interface device 114 are coupled to the electronic system by the cable 115.

FIG. 2 shows a second exemplary embodiment of the Mouth Mouse. A sensor-mounting device 209 contains sensor 211 and is located inside the mouth 205. The sensor-mounting device 209 is held in place by clips (not shown) that are hooked around individual teeth 203. The sensor-mounting device 209 includes a top cover 204 to protect the Mouth Mouse electronics from moisture. The sensor 211 has regions that represent at least the four primary directions, as indicated by a set of co-ordinate X-Y axes, along which an individual would move a control signal for an electronic system. The tongue 207 of the individual is used to select one or more regions of the sensor 211 as an indication of the desired direction of movement for a signal that is used to control an electronic system. A sensor interface device 201 may convert the sensor signals from the sensor 211 into control signals compatible with an electronic system to be controlled. A non-limiting example of the sensor interface device is shown in FIG. 1b and above discussed. A radio frequency transmitter 202 couples the control signals or sensor signals from the sensor interface device 201 to the electronic system. A radio frequency receiver is located at an electronic system, such as a computer or motorized wheelchair, and receives the signals transmitted by the radio frequency transmitter that are used to move a cursor, arrow or other input interface.

FIG. 3 shows a third exemplary embodiment of the mouth mouse. A sensor-mounting device 303 contains sensor 305 and is located inside the mouth. The sensor-mounting device 303 is held in place by a mouth guard 301 that will cover the teeth. The sensor-mounting device 303 includes a top cover (not shown) to protect the Mouth Mouse electronics from moisture. As above discussed, the tongue of the individual is used to select one or more of the regions of the sensor 305 as an indication of the desired direction of movement for a signal that is used to control an electronic system. A sensor interface device 314 may convert the signals from the sensor 305 into control signals compatible with the electronic system to be controlled. A non-limiting example of the sensor interface device is shown in FIG. 1b and above discussed. The control signals or sensor signals from the sensor interface device 314 are coupled to an electronic system, such as a computer 309, by an infrared transmitter 307 located in the mouth guard 301. The signals transmitted 308 by the infrared transmitter 307 are received by an infrared receiver 315 located at the electronic system and used to move a cursor, arrow or other input interface. In particular, the non-limiting example in FIG. 3 shows the input interface as a cursor 311 on the screen 313 of the computer 309.

Figure 4:
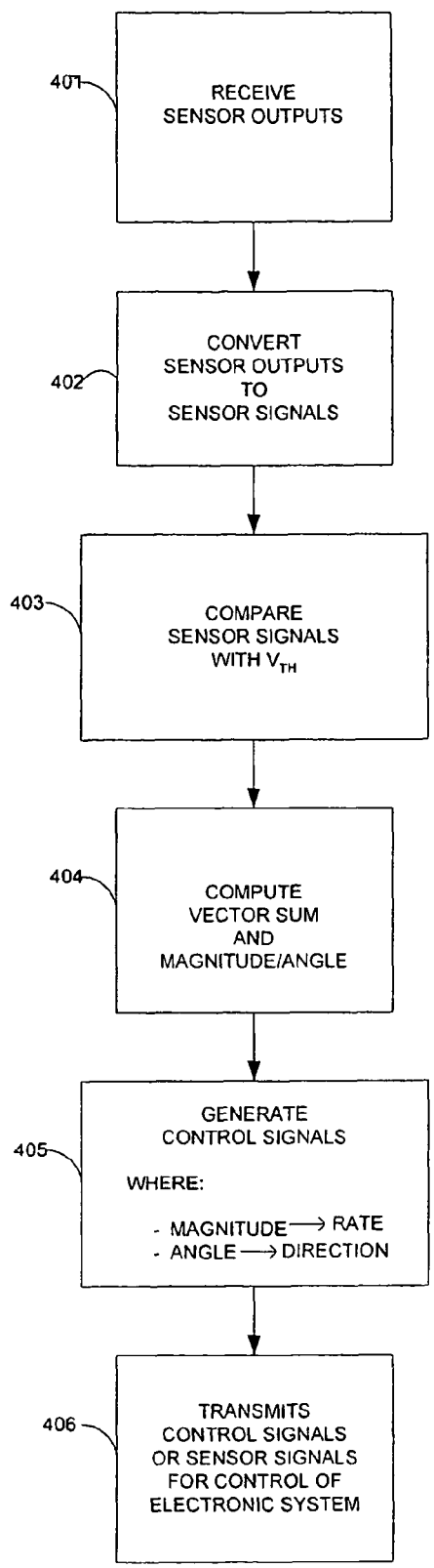
FIG. 4 is an exemplary flow diagram of a method for remotely controlling an electronic system.

FIG. 4 is an exemplary flow diagram of a method for controlling an electronic device when control signals or sensor signals are transmitted from an input device (e.g., the Mouth Mouse). Sensor outputs from each sensor are received as shown in step 401. Sensor outputs are converted to sensor signals as shown in step 402. Each of the sensor signals is compared to a predetermined threshold ($V_{TH}$) in step 403. A vector sum of the sensor signals that exceed $V_{TH}$ is computed and the magnitude and angle of the vector sum are determined in step 404. Control signals that indicate the rate and direction of movement for an input interface (e.g., a cursor, arrow, on-screen icon) are generated from the magnitude and angle, respectively, of the vector sum in step 405. Either control signals or sensor signals are transmitted for control of the electronic system in step 406. Coupling of these signals to the electronic system may be by at least one of cable, radio frequency transmission, and infrared transmission.

Figure 5:
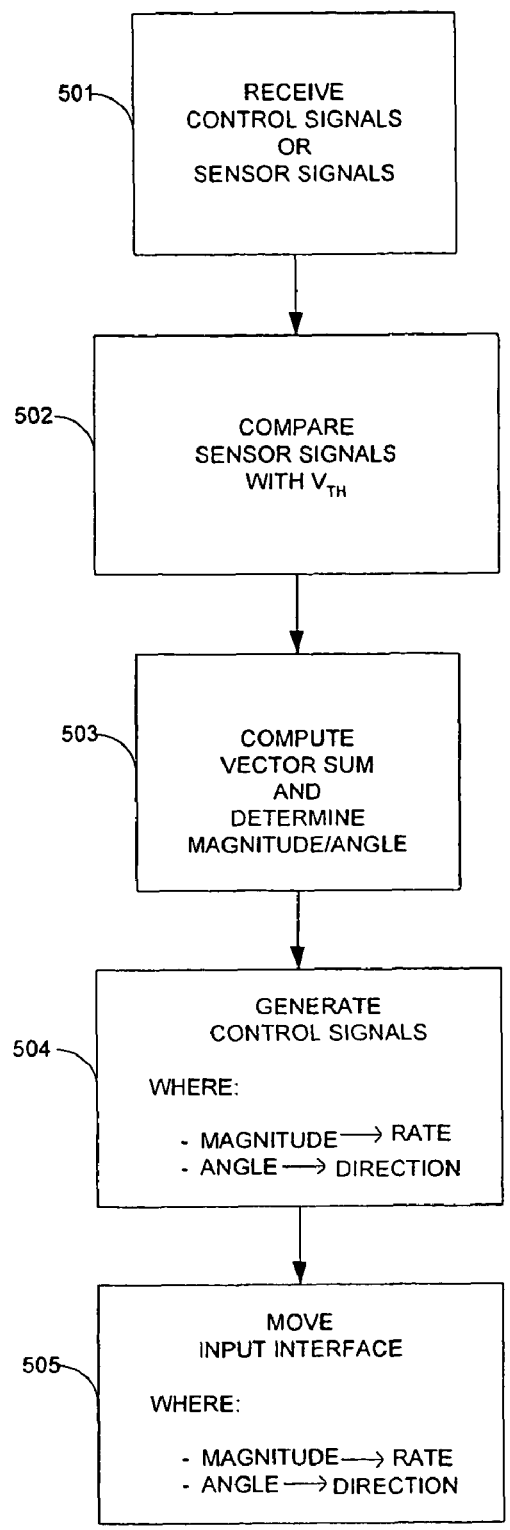
FIG. 5 is an exemplary flow diagram of a method for moving an input interface indicator.

FIG. 5 is an exemplary flow diagram of a method for moving an input interface (e.g., a cursor, arrow, on-screen icon) when control signals or sensor signals are received at the electronic system. In particular, sensor signals are received at step 501 and each sensor signal is compared to a predetermined threshold ($V_{TH}$) in step 502. A vector sum of the sensor signals that exceed $V_{TH}$ is computed and the magnitude and angle of the vector sum are determined in step 503. Control signals that indicate the rate and direction of movement for an input interface (e.g., a cursor, arrow, on-screen icon) are generated from the magnitude and angle of the vector sum in step 504. In step 505, an input interface is moved in accordance with the control signals (i.e., magnitude of the vector sum, which determines the rate, and the angle of the vector sum, which determines the direction). Either sensor signals or control signals may be received for control of the electronic system. For the case where control signals are received, only step 505 of FIG. 5 need be implemented. Reception of these control signals or sensor signal signals by the electronic system may be by at least one of cable, radio frequency transmission, and infrared transmission.

Figure 6:
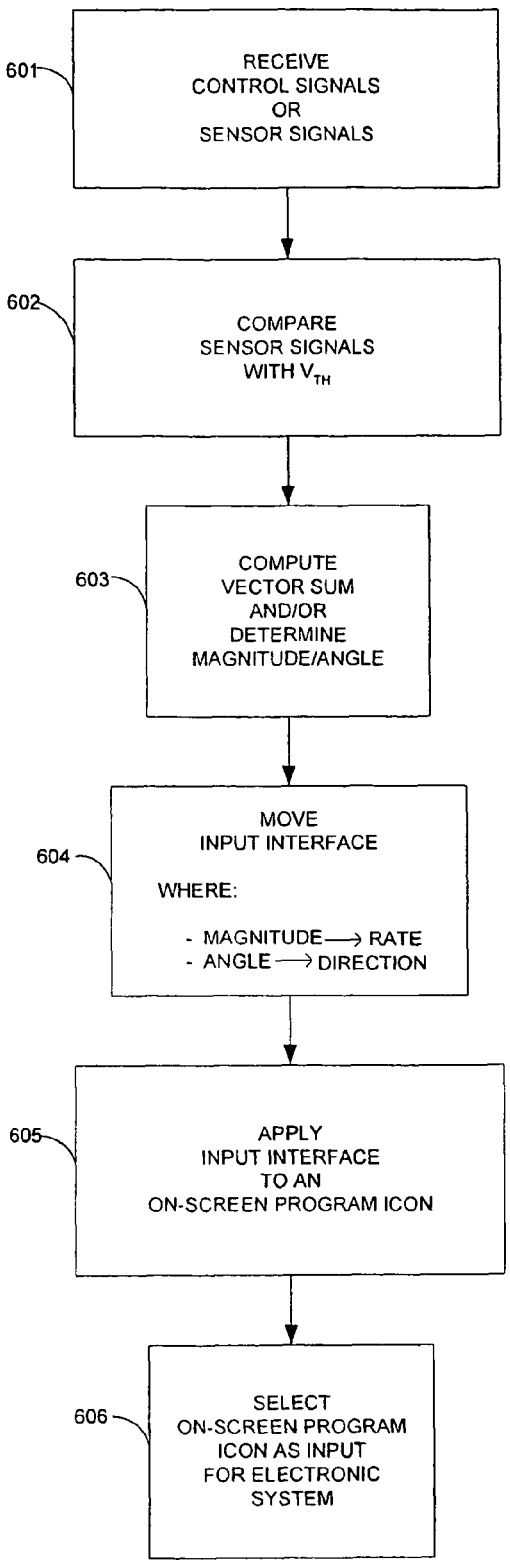
FIG. 6 is an exemplary flow diagram of a method for controlling an electronic system.

FIG. 6 is an exemplary flow diagram of a method for controlling an electronic system when control signals or sensor signals are received at an electronic system. In particular, when sensor signals are received in step 601, each sensor signal is compared to a predetermined threshold ($V_{TH}$) in step 602. A vector sum of the sensor signals that exceed $V_{TH}$ is computed and the magnitude and angle of the vector sum are determined in step 603. Control signals that indicate the rate and direction of movement for an input interface indicator (e.g., a cursor, arrow, on-screen icon) are generated from the magnitude and angle of the vector sum in step 604. In step 605, an input interface is moved in accordance with the control signals (i.e., the magnitude of the vector sum, which determines the rate, and the angle of the vector sum, which determines the direction). When the input interface reaches a final destination (e.g., hovering above a desired program icon), it is applied to the on-screen program icon and selects the on-screen icon, in steps 605 and 606, respectively. Non-limiting examples of program icons include keyboard keys; WINDOWS program icons, general-purpose screen icons, WINDOWS programs, and other well-known "point-and-click" type software applications. Either sensor signals or control signals may be received for control of the electronic system. For the case where control signals are received, only step 604 through step 606 of FIG. 6 need be implemented.

Reception of the control signals or sensor signals by the electronic system may be by at least one of cable, radio frequency transmission, and infrared transmission.

Figure 7:
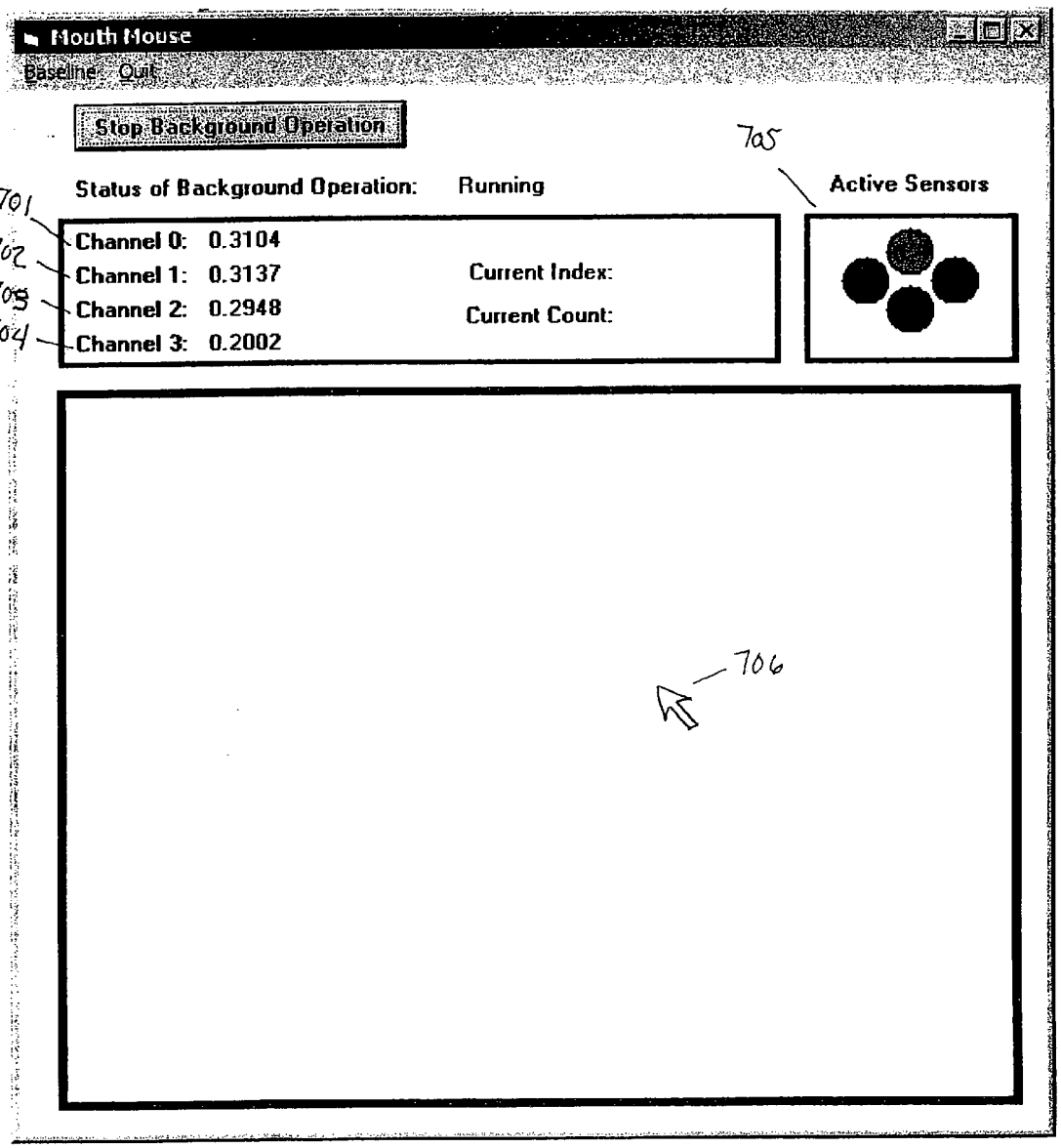
FIG. 7 is an exemplary screen capture of the software interface to the Mouth Mouse.

FIG. 7 shows a non-limiting example of a software interface for the Mouth Mouse. Sensor signals 701-704 are displayed numerically and active sensors are displayed graphically 705, as shown in FIG. 7. Active sensors may be indicated in green and inactive sensors (i.e., sensor signals <$V_{TH}$) may be indicated in red. An arrow icon 706 can be moved to give a user an indication that the Mouth Mouse is operating.

Figure 8:
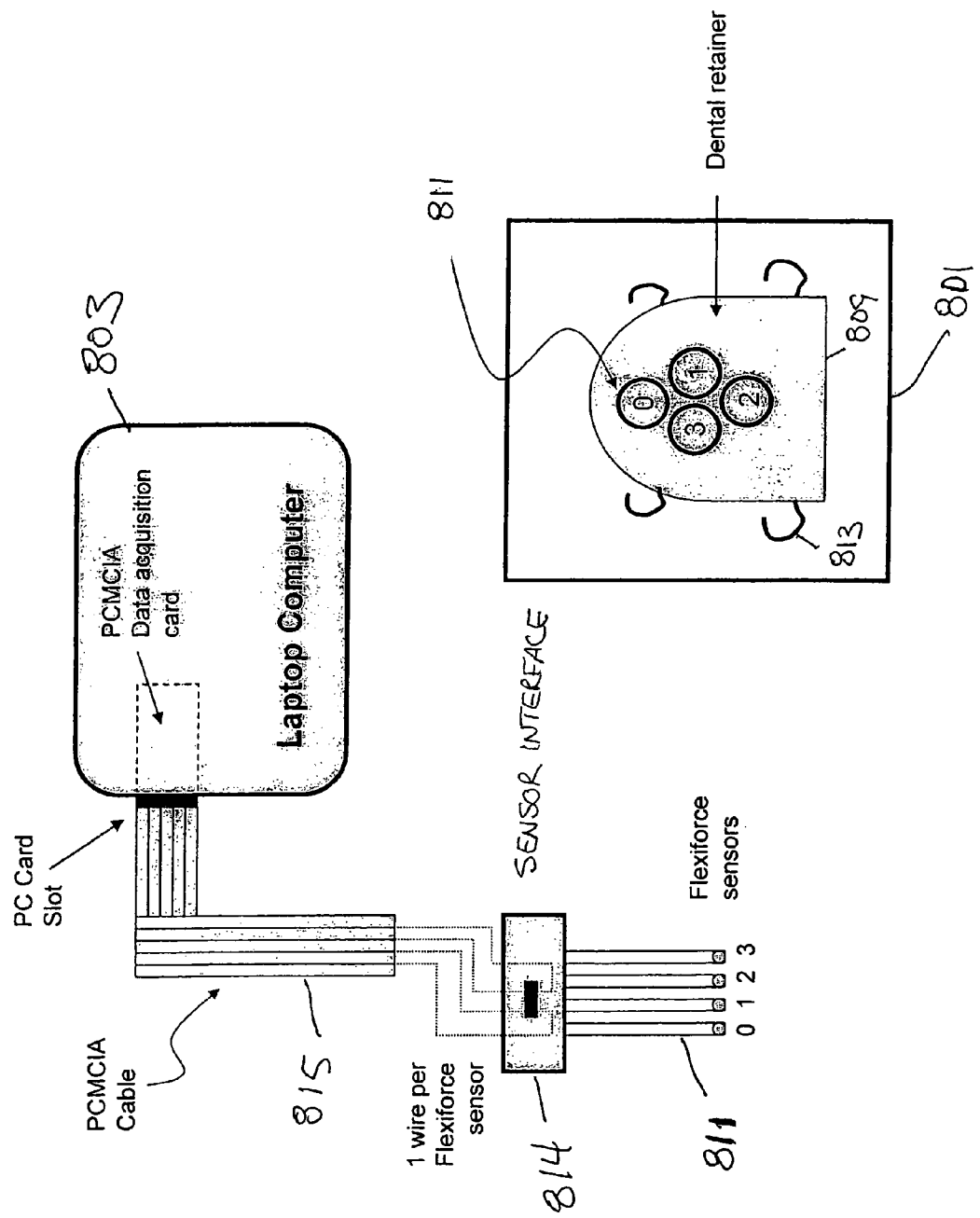
FIG. 8 is an exemplary block diagram of a system for controlling an electronic system.

FIG. 8 is an exemplary block diagram showing a system for controlling an electronic system. The system includes a Mouth Mouse 801 with a sensor-mounting device (e.g., a retainer, mouth guard) and tongue-activated sensors 811. The sensor-mounting device 809 is secured in the mouth of the individual by clips 813. The sensors are connected to an electronic system to be controlled (e.g., a computer 803) by the sensor interface 814. The sensor interface device 814 may determine control signals from the sensor signals. The sensor interface may also couple either control signals or sensor signals to the computer by at least one of cable 815, radio frequency transmission, or infrared transmission.

What is claimed is:

1. An apparatus for tongue-operated control of an electronic system, the apparatus comprising:
    a sensor-mounting device configured to reside in a user's mouth;
    one or more sensors mounted on the sensor-mounting device and configured to interface with a user's tongue; and
    a sensor interface device configured to convert information from the sensors into control signals, connect the apparatus to the electronic system, and communicate the control signals to the electronic system, the sensor interface device configured to measure sensor signal voltages from each sensor; compare the sensor signal voltages with a predetermined threshold value; compute a vector sum using sensor signal voltages that exceed the predetermined threshold values; determine magnitude data and angle data corresponding to said vector sum; generate control signals indicative of a rate related to the magnitude data and a direction related to the angle data; and transmit the control signals for control of the electronic system.

2. The apparatus of claim 1, wherein the sensor-mounting device comprises a dental retainer or a mouthguard.

3. The apparatus of claim 1, wherein the sensor interface device comprises a wired connection for transmitting control signals to the electronic system.

4. The apparatus of claim 1, wherein the sensor interface device comprises a wireless connection for transmitting control signals to the electronic system.

5. The apparatus of claim 4, wherein the wireless connection comprises a radio frequency communications device or an infrared signal communications device.

6. A system for controlling an electronic system, the system comprising:
    the electronic system; and
    the tongue-operated controller of claim 1 in communication with the electronic system.

7. The system of claim 6, wherein the sensor interface device resides at least in part with the sensor-mounting device.

8. The system of claim 6, wherein the sensor interface device resides at least in part with the electronic system.

9. The system of claim 6, wherein the electronic system comprises a computer or a motorized wheelchair.

10. The apparatus of claim 1, wherein the sensor-mounting device is a mouthpiece.

11. The apparatus of claim 1, wherein the apparatus is configured to allow the user to select one or more regions of the one or more sensors as an indication of a desired rate and direction of movement for control of the electronic system.

12. The apparatus of claim 1, wherein the one or more sensors are selected from the group consisting of: pressure sensors, temperature sensors, and a single surface sensing device comprising a 2-dimensional array of miniature sensors.

13. The apparatus of claim 1, wherein the one or more sensors comprises one or more protrusions from the sensor-mounting device.

14. The apparatus of claim 1, wherein the one or more sensors comprises four protrusions from the sensor-mounting device, each protrusion representing one of the four primary directions.

15. The apparatus of claim 1, wherein the sensor interface device is located on the sensor-mounting device.

16. The apparatus of claim 1, wherein the one or more sensors comprise non-joystick sensors mounted on a single surface, the one or more sensors operative by selection of one or more regions of the surface by the user's tongue, the one or more sensors representing at least four primary directions indicated by a set of co-ordinate X-Y axes that form a set of ortho-normal basis vectors that completely span a 2 dimensional space.

17. The apparatus of claim 16, wherein the sensor interface device is located on the sensor-mounting device.

18. A system for controlling an electronic system, the system comprising:
   the electronic system; and
   a tongue-operated controller in communication with the electronic system, the tongue-operated controller comprising:
   a sensor-mounting device configured to reside in a user's mouth;
   one or more sensors mounted on the sensor-mounting device and configured to interface with a user's tongue; and
   a sensor interface device configured to convert information from the sensors into control signals, connect the apparatus to the electronic system, and communicate the control signals to the electronic system, the sensor interface device configured to measure sensor signal voltages from each sensor; compare the sensor signal voltages with a predetermined threshold value; compute a vector sum using sensor signal voltages that exceed the predetermined threshold values; determine magnitude data and angle data corresponding to said vector sum; generate control signals indicative of a rate related to the magnitude data and a direction related to the angle data; and transmit the control signals for control of the electronic system.

19. The system of claim 18, wherein the sensor interface device comprises an A/D converter.

20. The system of claim 18, wherein the electronic system comprises an input interface indicator, wherein the input interface indicator is configured to move at a rate related to the magnitude data and in a direction related to the direction data.

21. The system of claim 20, wherein the electronic system further comprises a display screen with an on-screen program icon, in which the input interface indicator is configured to allow a user to select the on-screen program icon.

22. The system of claim 21, wherein the on-screen program icon is selected from the group consisting of: a key for an on-screen keyboard, an icon for starting a computer program, an icon for making a selection in an on-screen computer program, and a combination thereof.

23. The system of claim 20, wherein the input interface indicator comprises at least one of a cursor or an arrow.

* * * * *